United States Patent [19]

Hashimoto

[11] Patent Number: 4,783,797
[45] Date of Patent: Nov. 8, 1988

[54] TELEPHONE ANSWERING DEVICE AND METHOD HAVING INCOMING VOICE MESSAGE REPRODUCTION LOUDSPEAKER

[75] Inventor: Kazuo Hashimoto, Tokyo, Japan

[73] Assignee: Hashimoto Corporation, Tokyo, Japan

[21] Appl. No.: 816,631

[22] Filed: Jan. 6, 1986

[30] Foreign Application Priority Data

Jan. 7, 1985 [JP] Japan ................... 60-000529

[51] Int. Cl.⁴ ............................................. H04M 1/65
[52] U.S. Cl. ...................................................... 379/79
[58] Field of Search ................. 360/72.2; 379/70, 74, 379/77, 80

[56] References Cited

U.S. PATENT DOCUMENTS

4,152,547   5/1979   Theis ................................... 379/70
4,421,954  12/1983   Mita et al. ........................ 360/722

FOREIGN PATENT DOCUMENTS

57-26953   2/1982   Japan .
57-23353   2/1982   Japan .

*Primary Examiner*—Raymond F. Cardillo
*Assistant Examiner*—James E. Tomassini
*Attorney, Agent, or Firm*—Lowe, Price, LeBlanc, Becker & Shur

[57] ABSTRACT

A telephone answering device with an amplication feature during outgoing message has a blank portion for a couple of seconds between first outgoing message and second outgoing message. If a calling party speaks his name during the blank portion, his voice is amplified in the region of the device to be answered by any people around it. If the calling party does not speak his name, however, a second outgoing message will be produced after the blank portion. After a beep tone, the calling party can leave his message on the incoming message tape.

2 Claims, 3 Drawing Sheets

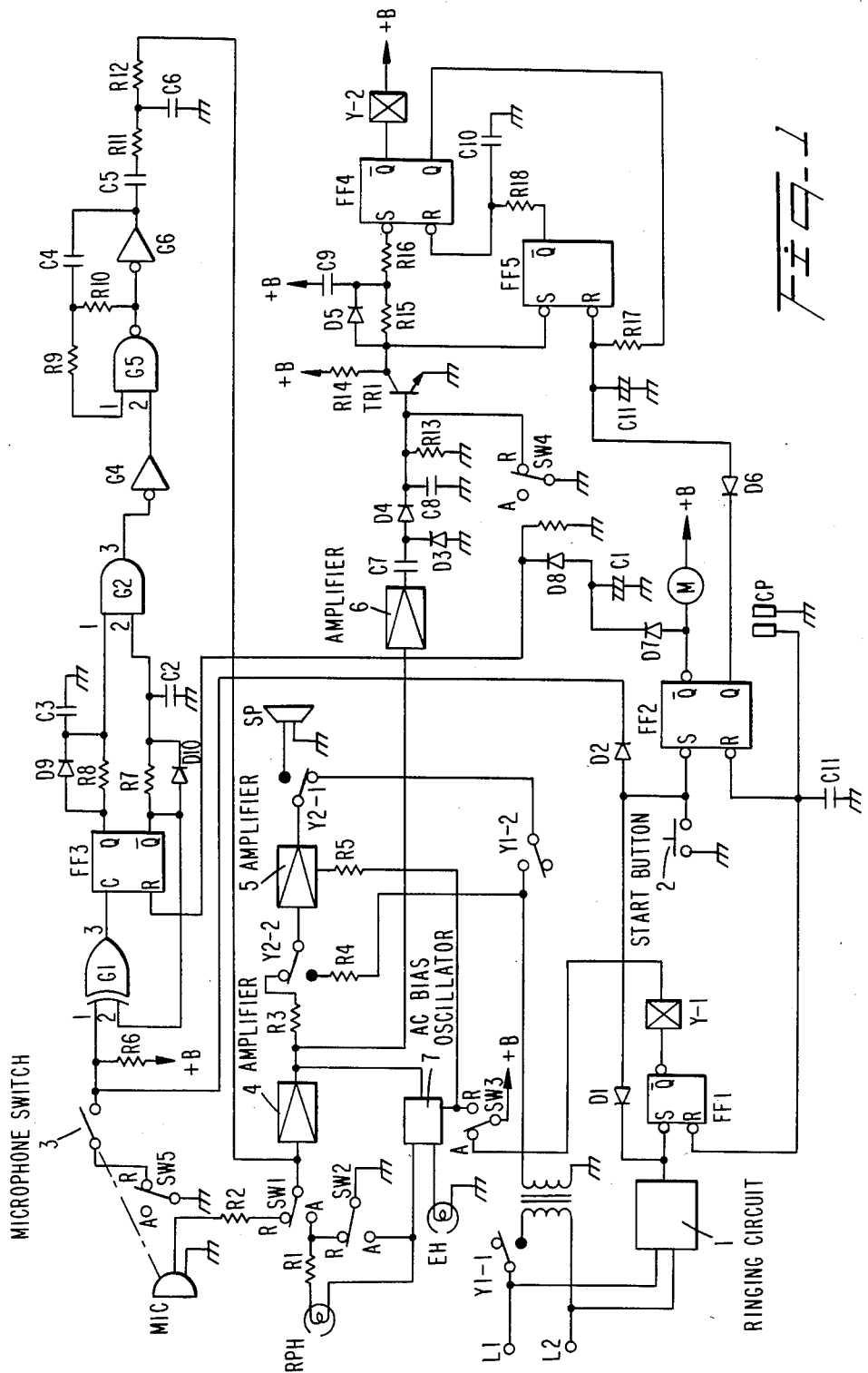

TELEPHONE ANSWERING DEVICE AND METHOD HAVING INCOMING VOICE MESSAGE REPRODUCTION LOUDSPEAKER

BACKGROUND OF THE INVENTION

The present invention relates to a telephone answering device capable of amplifying only a calling party's name upon receiving a call so as to be heard by persons in proximity to the device.

There are some prior art of devices which request the calling party to speak his name and amplify his voice upon receiving of a call, for example, JAPAN 57-23353 (A) or JAPAN 57-26953 (A) by the same applicant. These devices usually record a mark or a signal after the first outgoing message requesting the calling party's name to amplify and energize an amplifying circuit to amplify the voice of a calling party and after a couple of seconds record the second outgoing message. But these means to record a mark between the first and the second outgoing message for a couple of seconds continuously is sometimes difficult for general use.

SUMMARY OF THE INVENTION

The present invention relates to improvement of the conventional devices such as above-mentioned.

According to the present invention, there is provided a device which is capable of making a blank portion after recording the first outgoing message, for example, "This is Hashimoto corporation. Who's speaking, please?", and energizing the amplifying circuit to amplify the calling party's voice during above blank portion without using the above-mentioned audible continuous mark or signal for a couple of seconds, then recording the second outgoing message continuously through a microphone.

It is a second object of the invention to make it possible to record the brief beep tone only at the end point of the first outgoing message, to energize an amplifying circuit from this point for a couple of seconds during the above blank portion then to start to record the second outgoing message through a microphone.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 1 is a circuit diagram of the present invention;

DESCRIPTION OF THE PREFERRED EMBODIMENTS

The arrangement and operations of the preferred embodiments according to the present invention will be described.

Referring to FIGS. 1, L-1, L-2 are telephone lines. LT is a line transformer. 1 is a ringing circuit on detecting a calling signal. FF-1 is a flip-flop circuit which is set by an output of the above-mentioned ringing circuit 1, supplies current to a relay Y-1 for loop making and is reset when a outgoing message (herein after call as O.G.M.) tape T-1 completes one cycle as determined by a conductive foil (not shown) at the end of the tape bridging the electrode CP. FF-2 is a flip-flop circuit which is set by output of the above-mentioned ringing circuit 1 or is set when a starting button 2 or a microphone switch 3 is energized, supplies current to a motor M-1 for driving the above-mentioned O.G.M. tape T-1 and is reset when the conductive foil bridges the electrode CP as above-mentioned. SW-1 to SW-5 are switches for another operation mode. "R" is the position for recording the O.G.M. and the beep tone on the above-mentioned O.G.M. tape T-1. "A" is the position for an automatic telephone answering and recording mode. MIC is a microphone. RPH is a recording and playback head. EH is a erasing head. 4 to 6 are amplifiers, and 7 is a AC bias oscillator. SP is a loudspeaker. FF-3 is a binary type flip-flop circuit which is set when the above-mentioned microphone switch 3 is turned off, is reset when the microphone switch 3 is turned on and effects to record the beep tone mentioned later on the two points of the tape when FF-3 is set and reset as above-mentioned. FF-4 is a flip-flop circuit which is set by the first beep tone recorded at the above-mentioned position and is reset when the flip-flop circuit FF-5 is set. FF-5 is a S-R type flip-flop circuit whichis set by the above-mentioned second beep tone and is reset when above-mentioned FF-4 has been reset. G-1 is an exclusive OR gate. G-2 is a NAND gate which effects a timer to record the above-mentioned beep tone for the fixed moment. G-5 and G-6 are multivibrators for generating the above-mentioned beep tone.

Figure 2A:
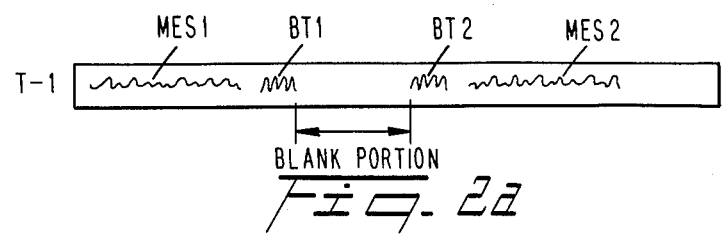
FIG. 2(a) is a diagram of the tape on which a mark or a signal are recorded.

The total operation will be described as follows. First, SW-1 to SW-5 are simultaneously switched to the 'R' position for recording the O.G.M. and the beep tone. When the microphone switch 3 is turned on, a flip-flop circuit FF-2 is set through a diode D-2 and a motor M is energized to start the running of the O.G.M. tape T-1 shown in FIG. 2. Accordingly, when the O.G.M. is spoken to a microphone MIC, the recording of the first outgoing message MES-1 shown in FIG. 2(a) is started. After the recording of the first outgoing message MES-1, a microphone switch 3 is turned off. Now a terminal 1 of an exclusive OR gate G-1 switches from a low level L to a high level H. Terminal 2 of G-1 is at a high level by the output of a terminal $\overline{Q}$ of the flip-flop circuit FF-3. Thus, a terminal 3 of G-1 switches from low to high, the flip-flop circuit FF-3 changes state and a condenser C-2 is charged to the H level through a diode D-10 by output $\overline{Q}$ of FF-3. When FF-3 changes state and a terminal $\overline{Q}$ of FF-3 becomes low, the above-mentioned condenser C-2 is discharged through a resistor R-7. When the time constant is fixed to 1.5 seconds, a pulse is generated for 1.5 seconds by output of the above-mentioned G-2 and a beep tone circuit formed by the NAND gate G-5 and an inverter G-6 is energized through an inverter G-4. The beep tone output is recorded as the first beep tone BT-1 shown in FIG. 2(a) through a resistor R-11 and R-12. After that, the blank portion not recorded (this portion will be amplified, as mentioned later) is made for a couple of seconds. It is also possible to ground the input of amplifier 4 when the above-mentioned microphone switch is turned off to make this blank portion. Next, a microphone switch 3 is turned on again to record the second beep tone BT-2 and the second outgoing message MES-2. Since the flip-flop circuit FF-3 is set as above-mentioned, terminal 2 of the exclusive OR gate G-1 is low. As terminal 1 of G-2 is switched low when the microphone switch 3 is turned on as above-mentioned, the output of G-3 is switched high and the above-mentioned FF-3 is now reset. Due to the reset state of FF-3, according to the same effect as the set state of FF-3, a pulse is generated for 1.5 seconds by output G-2, the beep tone circuit which is formed by G-5 and G-6 is energized and the second beep tone BT-2 shown in FIG. 2(a) is recorded on the O.G.M. tape T-1. After that, if words are spoken into the microphone MIC as above-mentioned, the second outgoing message MES-2 shown in FIG. 2(a) is recorded on O.G.M. tape T-1. When the O.G.M. tape T-1 completes one cycle and a conductive foil (not shown) at T-1 bridges the electrode CP, the flip-flop circuit is reset and the O.G.M. tape stops.

Figure 2B:
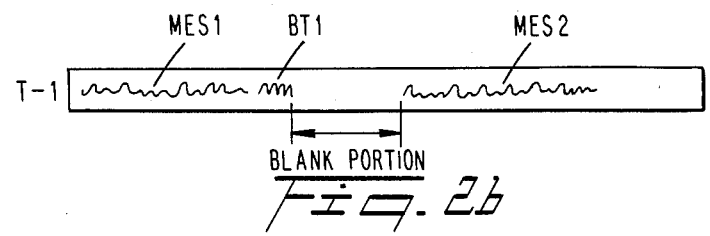
FIG. 2(b) is another example of FIG. 2(a)
Figure 4:
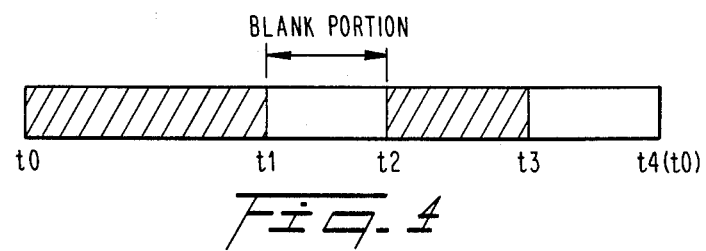
FIG. 4 is a diagram of the tape in the second embodiment.

Operation will be described in a condition in which SW-1 to SW-5 are switched to the "A" position for automatic answering. When a calling signal comes from the telephone lines L-1 and L-2, the flip-flop circuit FF-1 is set by output of the ringing circuit 1, the relay Y-1 is energized and a loop circuit is formed through the contact y1-1. At the same time the flip-flop circut FF-2 is set by the output of the ringing circuit 1 through the diode D-1 and the O.G.M. tape starts running as above-mentioned. Now the first outgoing message MES-1 recorded as shown in FIG. 2(a) is played back by the recording and playback head RPH and, as shown in the figure, clearly is sent into the telephone lines through the amplifiers 4, 5 and the line transformer LT. The above-mentioned O.G.M. signal is rectified by the diodes D-3 and D-4 through the amplifier 6 and turns a transistor TR-1 on and off repeatedly according to the level of the O.G.M. signal. The condenser C-9 is charged through the resistor R-15 when the transistor TR-1 is turned on. As the time constant of R-15 by C-9 is about 1 second, the above C-9 is never charged to the fixed value. When the first beep tone BT-1 whose amplitude is fixed in FIG. 2(a) is played back, the above condenser C-9 is charged to the fixed value and the flip-flop circuit FF-4 can be set by the charging output. When FF-4 is set, the relay Y-2 is kept in operation and the contacts y2-2 and y2-1 are switched to the reverse position shown in the figure. Now the loudspeaker SP is connected to output side of the amplifier 5 by the contact y2-1 and the line transformer LT is connected to input of the above amplifier 5 by the contact y2-2. At the end of the first O.G.M. the message, "Who's speaking, please?" is included and when the calling party speaks his name is answer to this message, his voice is amplified through the line transformer LT, the contact y2-2, the amplifier 5, the contact y2-1 and the loudspeaker SP. The portion between the first beep tone BT-1 and the second beep tone BT-2 in FIG. 2(a) is the above-mentioned amplifying period. After the above-mentioned amplifying period, the second beep tone BT-2 is played back and the transistor TR-1 is energized by this beep tone as mentioned above. As the flip-flop circuit FF-5 is released from the reset state through the resistor R-17 about two seconds after the flip-flop circuit FF4 is set, the flip-flop circuit FF-5 is set when the above transistor TR-1 is energized. When FF-5 is set, FF-4 is reset through the resistor R-18, the relay Y-2 is turned off and the above-mentioned amplifying period is terminated. After the termination of the amplifying period, the second message MES-2 is sent out. After the O.G.M. tape completes one cycle, the foil on the tape (not shown) bridges the electrode CP, the flip-flop circuits FF-1 and FF-2 are reset and the device returns to the standby mode. Though the tape for receiving to record the message from the calling party is not provided in the present figure, it is possible to arrange to make the beep tone recorded after the second message and to make the above receiving tape start when this beep tone is detected. It is also possible to omit the second beep tone as shown in FIG. 2(b) and to terminate the above amplifying period at the beginning of the second message.

Figure 3:
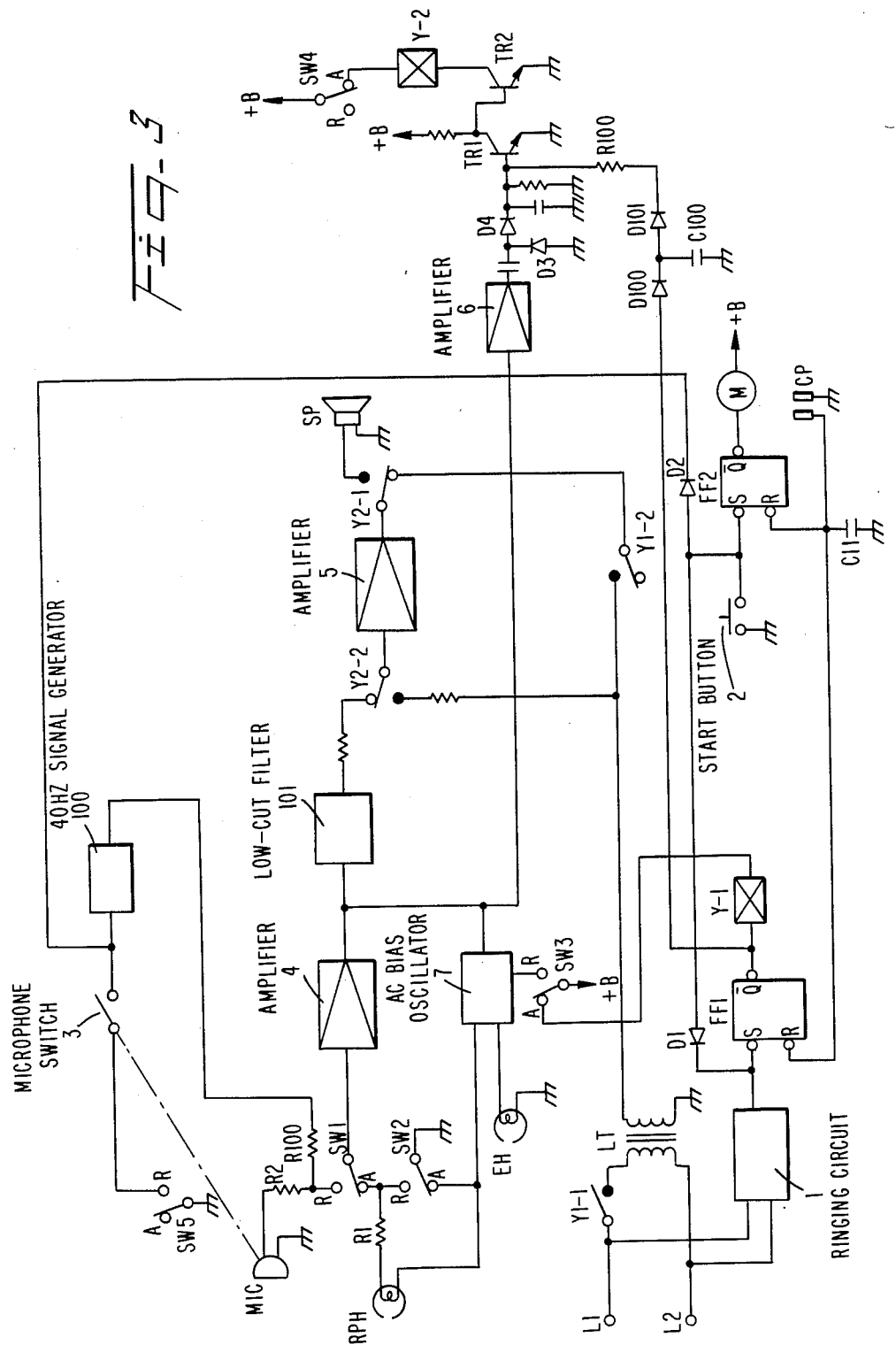
FIG. 3 is a circuit diagram of the second embodiment of the present invention.

Referring now briefly to FIG. 3 of another embodiment, 100 is a 40 HZ signal generator which oscillates while the microphone switch 3 is turned on. While the above-mentioned first and second O.G.M. are recorded, the above 40 HZ signal is recorded over the messages. The above 40 HZ signal which is played back simultaneously with the above O.G.M. is removed by a low frequency blocking filter and kept from being sent into the telephone line upon receiving of call. The above 40 HZ signal is rectified by the diodes D-3 and D-4 through the amplifier 6 and keeps the transistor TR-1 energized while the above 40 HZ signal is played back. Accordingly the transistor TR-2 as well as relay Y-2 is not energized. During only the above-mentioned blank portion between the first and the second O.G.M., the above transistor TR-1 is not energized. Thus, but TR-2 is energized, the relay Y-2 for amplifying is energized and the voice of the calling party who speaks his name is amplified during this time as mentioned in FIG. 1.

It is also possible to arrange two tracks of the above O.G.M. tape, one to record the O.G.M., and other track to record the signal of any frequency at the same position of the O.G.M. on the first track, so that the device can amplify the blank portion of the second track.

Thus, according to the present invention, there is provided a device capable of various functions and operations as described in the above embodiments. The present invention is exemplified by the automatic telephone answering device, but can also be applied to an interphone or information system of similar types as the invention.

In the conventional device, the means employed for arranging the amplifying portion to amplify the calling party's voice is complicated for a user to make and operate and the conventional device needs another function button for operating the device. According to the present device, these problems have been solved by turning the microphone switch off or recording the short beep tone to make the blank portion, thereby causing the device to amplify the calling party's voice. Therefore, the present invention is very advantageous in practical use.

Although certain preferred embodiments have been shown and described it should be understood that many changes and modifications may be made therein without departing from the scope of the appended claims.

What is claimed is:

1. A telephone answering device which makes a loop circuit to establish communication between calling and called parties on a telephone line upon reception of a calling signal and sends on the line an outgoing message prerecorded on a recording medium, comprising:
    switching means having a first state responsive to an incoming calling signal for controlling said device to reproduce from the recording medium a first pre-recorded outgoing message to a caller and immediately thereafter to establish on the recording medium a silent portion of a predetermined duration of time wherein any pre-recorded message is not reproduced, and a second state responsive to the end of said predetermined duration of time for controlling said device to reproduce from the recording medium a second prerecorded outgoing messaage;

means for amplifying the voice spoken by the calling party during said silent portion;

loudspeaker means for audibly reproducing the voice amplified by said amplifying means so that the called party will hear the voice without taking a telephone off-hook;

means for generating a low frequency signal;

means for blocking the low frequency signal from the telephone line;

means for recording on the recording medium the low-frequency signal before and after the silent portion;

means for detecting said low frequency signal to control said amplifying means to amplify outgoing messages during only the silent portion during play back; and means for turning off said amplifying means just before said second outgoing message is reproduced so that said second outgoing message is not reproduced by said loudspeaker means.

2. A method of operating a telephone answering device which makes a loop circuit to establish communication between calling and called parties on a telephone line upon reception of a calling signal and sends on the line an outgoing message pre-recorded on a recording medium, comprising the steps of:

reproducing of the recording medium a first prerecorded outgoing message to a caller on the line and immediately thereafter establishing of the recording medium a silent portion of a predetermined duration of time wherein any prerecorded message is not reproduced, and at the end of said predetermined duration of time reproducing from the recording medium a second pre-recorded outgoing message;

amplifying the voice spoken by the calling party during reproduction of said silent portion;

audibly reproducing the voice amplified by said amplifying means so that the called party will hear the voice of the calling party without taking a telephone off-hook;

generating a low frequency signal;

blocking the low frequency signal from the telephone line;

recording on the recording medium the low-frequency signal before and after the silent portion;

detecting said low frequency signals to control amplification of outgoing messages during only the silent portion during play back; and disabling amplification of the voice of the calling party just before said second outgoing message is reproduced so that said voice is not heard by the called party.

* * * * *